No. 613,498. Patented Nov. 1, 1898.
J. W. COVINGTON.
FERTILIZER DISTRIBUTER.
(Application filed May 28, 1898.)

(No Model.) 2 Sheets—Sheet 1.

WITNESSES

INVENTOR

No. 613,498. Patented Nov. 1, 1898.
J. W. COVINGTON.
FERTILIZER DISTRIBUTER.
(Application filed May 28, 1898.)
(No Model.) 2 Sheets—Sheet 2.
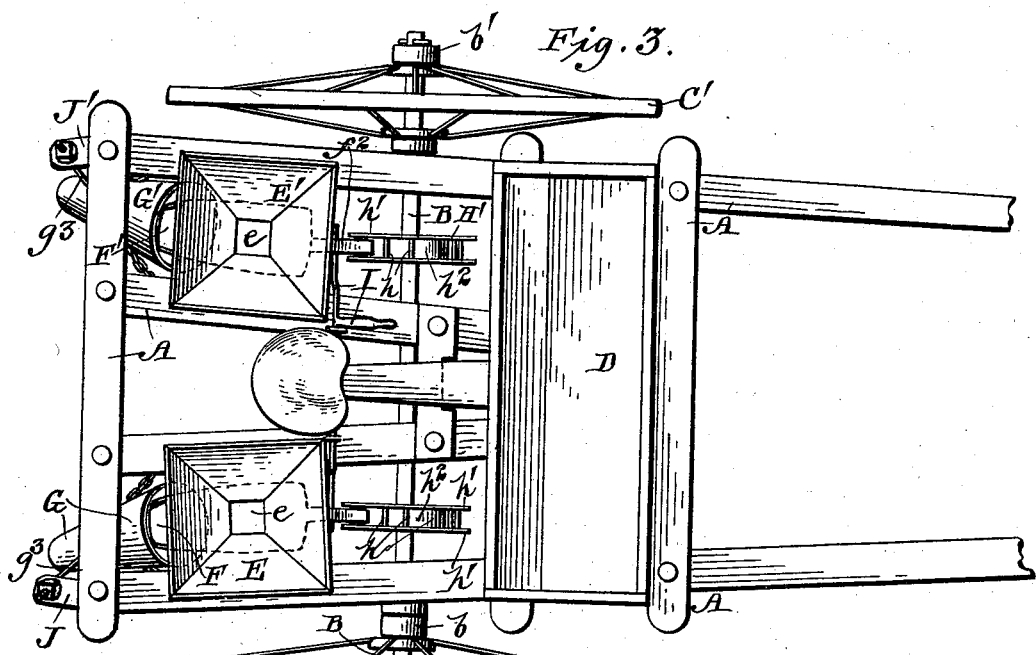
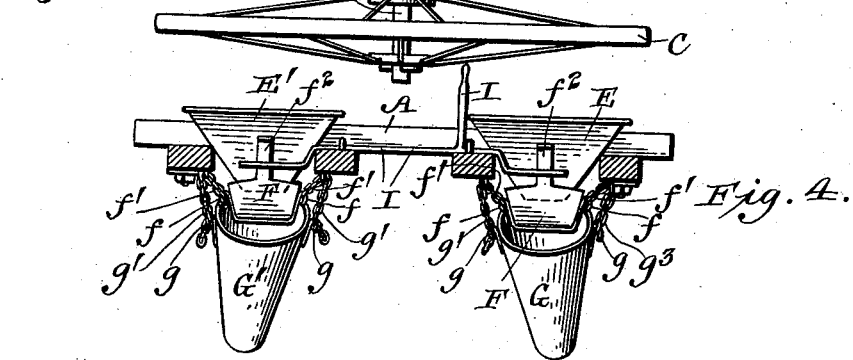
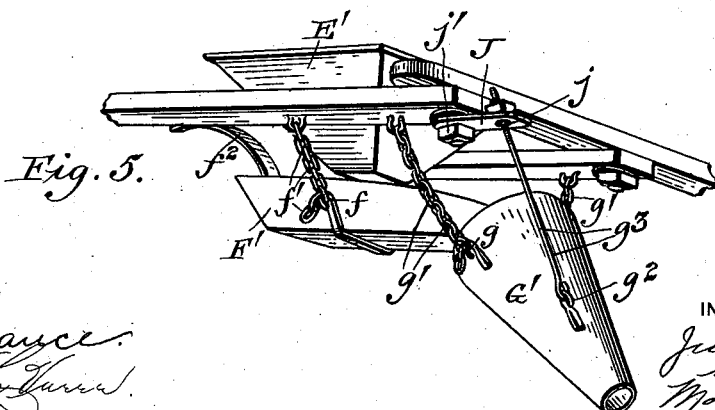
WITNESSES
INVENTOR

UNITED STATES PATENT OFFICE.

JULIUS WALTER COVINGTON, OF CHERAW, SOUTH CAROLINA.

FERTILIZER-DISTRIBUTER.

SPECIFICATION forming part of Letters Patent No. 613,498, dated November 1, 1898.

Application filed May 28, 1898. Serial No. 682,024. (No model.)

*To all whom it may concern:*

Be it known that I, JULIUS WALTER COVINGTON, a citizen of the United States, residing at Cheraw, in the county of Chesterfield and State of South Carolina, have invented certain new and useful Improvements in Fertilizer-Distributers; and I do hereby declare the following to be a full, clear, and exact description of the invention, such as will enable others skilled in the art to which it appertains to make and use the same.

My invention relates to improvements in fertilizer-distributers; and it consists of certain novel constructions, combinations, and arrangements of parts, as will be hereinafter described and specifically claimed.

The objects of my invention are to construct a fertilizer-distributer which is adapted to carry a considerable quantity of fertilizer within easy reach of the driver for supplying the hoppers and to provide two hoppers and novel means for distributing the fertilizer to two rows at a time, said distributing means being capable of being adjusted to regulate the supply of fertilizer or cut off the same entirely when desired.

Another object of my invention is to provide swinging adjustable distributing-spouts which are adapted to pass over obstructions and to automatically return to their normal operative positions.

Another object of my invention is to provide high wheels, which elevate the machine sufficiently to adapt it for use in applying fertilizer to partially-grown plants without injuring the same, said wheels being capable of longitudinal adjustment on the axle to accommodate the machine to different widths of rows, one of said wheels being preferably made loose on said axle to facilitate the turning of the machine.

Figure 1:
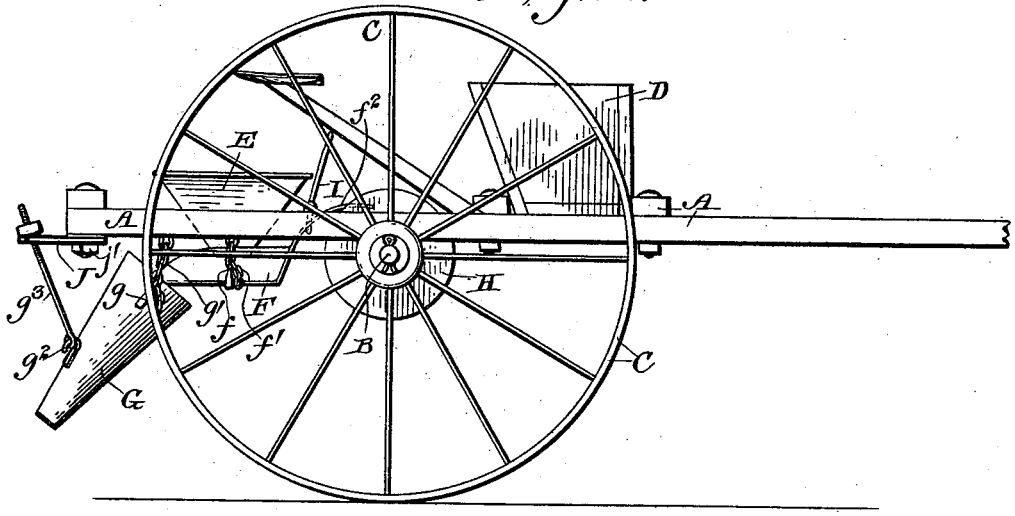
Figure 2:
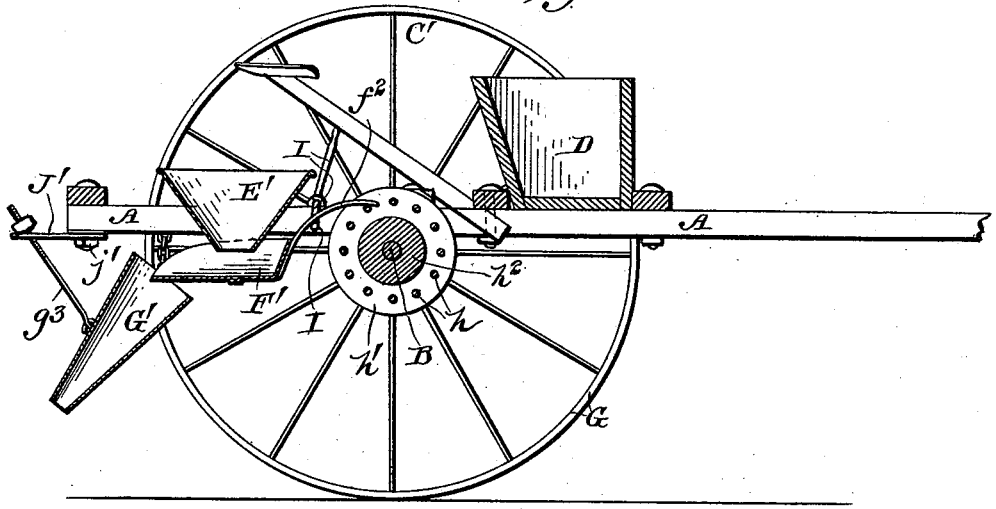

In the accompanying drawings, Figure 1 is a side elevation of my improved fertilizer-distributer. Fig. 2 is a vertical section through one of the hoppers, troughs, distributing-spouts, and knocker-wheels. Fig. 3 is a top plan view of my improved fertilizer-distributer. Fig. 4 is a vertical transverse sectional view through the frame of the machine, taken just in front of the hoppers and looking toward the same; and Fig. 5 is a fragmentary perspective view of one of the spouts and a portion of the rear end of the frame, looking at the spout from beneath and showing the manner of supporting and adjusting the same.

A in the drawings represents the frame of the machine; B, the axle; C C', the wheels; D, the fertilizer bin or box; E E', the hoppers; F F', the distributing-troughs; G G', distributing-spouts; H H', the knocker-wheels, and I the operating-lever.

The frame A is made of any suitable design, but preferably about that shown in the drawings, and is provided with a seat suitably located to admit of the driver readily operating the fertilizer-distributing mechanism for regulating the supply of fertilizer. In front of the driver's seat is located a large bin or box D, designed to hold three or four hundred pounds of fertilizer, from which box the hoppers E E' can be conveniently supplied. By this construction and arrangement considerable time and labor will be saved, as a large area of ground can be covered with fertilizer before it will be found necessary to replenish the box or bin D.

With my machine from sixteen to twenty acres of ground can be covered in one day by a single man and one horse.

The wheels C C' are made higher than are usually employed on machines of this character, so that the machine can be used to fertilize partially-grown plants without injuring the same. By driving the horse on the right side of a row the fertilizer will be distributed on the left side of two rows. One of the wheels is preferably made loose on the axle, so as to facilitate the turning of the machine. In order to accommodate the travel of the wheels to rows of different widths, I employ spacing collars or sleeves $b$ $b'$, which are adapted to be placed on the axle on either the inside or the outside of the wheels, as shown in the drawings.

The hoppers E E' are arranged on either side of the machine and each is formed flaring in shape at its upper end, the sides of each converging downwardly to a centrally-arranged opening $e$. Beneath the hoppers are arranged rearwardly-extending swinging troughs F F', which are provided near their forward ends with open eyes $ff$, by means of which they can be readily attached to and detached from adjusting-chains $f'\,f'$, which latter are attached, preferably, to the under side of the frame. By this construction and arrangement the troughs can be raised or lowered to regulate the supply of the fertilizer from the hoppers to said troughs and from said troughs to and through the distributing-spouts. The forward ends of the troughs are each formed with a forwardly-extending curved arm $f^2$. When it is desired to cut off the supply of fertilizer entirely from the hopper, I employ the lever I, which is arranged conveniently to be operated by the driver and extends laterally in both directions and engages the under side of the curved arms $f^2\,f^2$ of the pivoted swinging troughs F F', so that when the lever is moved backward or forward the troughs will be raised or lowered to cut off or admit of the discharge of the fertilizer from the hoppers. The preponderating weight of the troughs is at the forward ends of the same, so that when the operating-lever I is raised or lowered the curved arms of the troughs will follow the movement of the same without being directly connected thereto.

The knocker-wheels H H' are secured on the axle B in front of the hoppers, so that the pins $h$, which are arranged around the periphery of the wheels, will be engaged by the forwardly-extended curved portions or arms $f^2\,f^2$ of the distributing-troughs, so that when the machine is moved forward the arms $f^2\,f^2$ will be slightly agitated and a continuous vibrating movement thus imparted to the distributing-troughs, which will effectually prevent the clogging of the fertilizer in the hoppers and troughs and will convey it to the distributing-spouts. When it is desired to cut off the entire supply of fertilizer, the lever I is pressed downwardly and the curved arms $f^2\,f^2$ thereby raised out of engagement with the pins on the knocker-wheel, and thus further vibration of the distributing-troughs will be stopped. When the distributing-troughs are out of engagement with the knocker-wheels, the machine can be moved forward or backward without any fertilizer being accidentally distributed. As heretofore stated, the distributing-troughs can be further adjusted by means of the chains $f'\,f'$. The knocker-wheels H H' are constructed, preferably, of two side plates $h'\,h'$, with a solid central spacing-hub $h^2$, the pins $h$ being arranged and secured between the side plates $h'\,h'$ at a slight distance below the outer peripheries of the side plates, so that the side plates, above the pins $h$, will form side flanges, which will receive and guide the arms $f^2\,f^2$ of the distributing-troughs F F'. This construction will also prevent any liability of the driver's clothes being caught in the knocker-wheels.

The distributing-spouts G G' are made approximately truncated-cone-shaped in form, being open at both ends and larger at their upper ends than at their lower ends. Open eyes or hooks $g\,g$ are provided on the upper ends of the spouts, by which said spouts can be readily attached to or detached from chains $g'\,g'$, which latter are attached at suitable points on the frame of the machine. By this construction and arrangement the spouts can be readily adjusted to different lateral inclinations, so as to deliver the fertilizer to different widths of rows. This is accomplished by taking up the chain on either side of the spouts and allowing the chain on the other side of the spout to remain unadjusted Hooks or eyes $g^2\,g^2$ are also provided on the spouts at suitable points, to which rods $g^3\,g^3$ are attached. These rods $g^3\,g^3$ are preferably screw-threaded at their upper ends and are passed through openings $j\,j$, formed in rearwardly-extending pieces J J, which latter are preferably pivotally secured to the frame of the machine. A nut is provided on the screw-threaded portion of each rod $g^3\,g^3$ for adjusting the rods, and accordingly the distributing-spouts G G', to any desired vertical inclination, the nuts holding the distributing-spouts in their fixed adjusted positions, but the construction permitting of the spouts passing over stumps or other obstructions without being injured and to automatically return to their adjusted positions. If desired, the distributing-spouts can be adjusted laterally to enable the machine to distribute the fertilizer to different widths of rows by loosening the nuts $j'\,j'$, which secure the pieces J J to the frame of the machine, and turning the said pieces to the desired angle and then again tightening up the nuts. I regard these different adjustments of the swinging troughs and spouts as an important feature of my invention.

While I have described my machine as being provided with two hoppers and the distributing means as being duplicated, it is obvious that a single hopper and a single distributing means might be employed, but not to so great advantage.

Having now described my invention, what I claim as new, and desire to secure by Letters Patent, is—

1. In a fertilizer-distributer, the combination of a suitable wheeled frame, a hopper, a vertically-adjustable swinging distributing-trough, a vertically-adjustable swinging distributing-spout, the said spout being adapted to rise over an obstruction and automatically return to its adjusted position, substantially as described.

2. In a fertilizer-distributer, the combination of a suitable wheeled frame, a vertically-adjustable swinging distributing-trough, a vertically and laterally adjustable swinging distributing-spout, the said spout being constructed and arranged to ride over an obstruction and automatically return to its adjusted position, substantially as described.

3. In a fertilizer-distributer, the combination of a suitable wheeled frame, a hopper, a distributing-trough, a swinging distributing-spout, and means for adjusting the spout vertically and to ride over obstructions, said means comprising a pivoted rod which is connected at its lower end to the spout and passes loosely through a projection on the frame of the machine, said rod being provided with an adjusting-nut, substantially as described.

4. In a fertilizer-distributer, the combination of a suitable wheeled frame, a hopper, a distributing-trough, a swinging distributing-spout, means for adjusting the spout laterally and vertically, said means comprising a screw-threaded rod which is secured at its lower end to said spout and is passed through an apertured projection on the frame which projection is capable of lateral adjustment, and a nut on the screw-threaded rod for raising and lowering the same and the spout connected thereto, substantially as described.

5. In a fertilizer-distributer, the combination of a suitable wheeled frame, a hopper, a swinging trough provided with a forward extension, a vertically and laterally adjustable swinging distributing-spout, the said spout being adapted to rise over an obstruction and automatically return to its adjusted position, and a knocker-wheel for imparting a vibrating movement to the swinging trough, and a lever for disengaging the trough from the knocker-wheel, substantially as described.

6. In a fertilizer-distributer, the combination of a suitable wheeled frame, a hopper, a swinging trough provided with a forward extension, a vertically and laterally adjustable swinging distributing-spout, the said spout being adapted to rise over an obstruction and automatically return to its adjusted position, and a knocker-wheel which engages the swinging trough and imparts a vibrating movement thereto, said knocker-wheel comprising two side disks having a solid central spacing-hub and pins arranged around the wheel below the outer peripheries of the said side disks, and a lever for disengaging the knocker-wheel from the trough, substantially as described.

7. In a fertilizer-distributer, the combination of a suitable wheeled frame, a fertilizer box or bin carried by said frame, and two distributing means, each of said means comprising a hopper, a swinging trough, and a swinging spout, which latter is capable of vertical and lateral adjustment and is adapted to rise over an obstruction and automatically return to its adjusted position, knocker-wheels arranged on the axle of the machine to engage the troughs for imparting a vibrating motion thereto and a lever for disengaging the troughs from the knocker-wheels, substantially as described.

8. In a fertilizer-distributer, the combination of a suitable frame having high traction-wheels, one of which is loose on the axle and the other is fixed thereon, spacing collars or rings on the axle which are adapted to be placed on the inside or the outside of the wheel for varying the tread of the wheels, a large fertilizer box or bin carried on the frame of the machine, fertilizer-distributing means arranged on either side of the machine, each of said means comprising a hopper, a swinging trough, and a swinging spout, which latter is capable of vertical and lateral adjustment, knocker-wheels arranged on the axle of the machine for imparting a vibrating movement to the troughs and a lever for disengaging the troughs from the knocker-wheels, substantially as described.

In testimony whereof I hereunto affix my signature in presence of two witnesses.

JULIUS WALTER COVINGTON.

Witnesses:
R. T. CASTON,
P. B. HUNTLEY.